(12) United States Patent
Fujii et al.

(10) Patent No.: US 11,964,338 B2
(45) Date of Patent: Apr. 23, 2024

(54) METHOD FOR LOW-TEMPERATURE JOINING OF METAL MATERIALS, AND JOINT STRUCTURE

(71) Applicant: OSAKA UNIVERSITY, Suita (JP)

(72) Inventors: Hidetoshi Fujii, Suita (JP); Rintaro Ueji, Suita (JP); Yoshiaki Morisada, Suita (JP)

(73) Assignee: OSAKA UNIVERSITY, Suita (JP)

( * ) Notice: Subject to any disclaimer, the term of this patent is extended or adjusted under 35 U.S.C. 154(b) by 1144 days.

(21) Appl. No.: 16/080,780

(22) PCT Filed: Feb. 28, 2017

(86) PCT No.: PCT/JP2017/007677
§ 371 (c)(1),
(2) Date: Aug. 29, 2018

(87) PCT Pub. No.: WO2017/154658
PCT Pub. Date: Sep. 14, 2017

(65) Prior Publication Data
US 2021/0205918 A1    Jul. 8, 2021

(30) Foreign Application Priority Data

Mar. 11, 2016 (JP) .................. 2016-047806

(51) Int. Cl.
*B23K 20/12* (2006.01)
*B23K 20/227* (2006.01)
(Continued)

(52) U.S. Cl.
CPC ...... *B23K 20/1235* (2013.01); *B23K 20/1225* (2013.01); *B23K 20/123* (2013.01);
(Continued)

(58) Field of Classification Search
CPC ........................................... B23K 20/122–128
See application file for complete search history.

(56) References Cited

U.S. PATENT DOCUMENTS

| | | | | |
|---|---|---|---|---|
| 2010/0178526 | A1* | 7/2010 | Fujii | B23K 20/1235 428/615 |
| 2012/0185075 | A1* | 7/2012 | Babb | B23K 20/1235 700/145 |
| 2014/0166731 | A1* | 6/2014 | Seo | B23K 20/1265 228/112.1 |

FOREIGN PATENT DOCUMENTS

| | | |
|---|---|---|
| JP | 2005-131679 A | 5/2005 |
| JP | 2008264806 A * | 11/2008 |

(Continued)

OTHER PUBLICATIONS

Khaled, "An Outsider Looks at Friction Stir Welding", ANM-112N-05-06 (Jul. 2005) (Year: 2005).*

(Continued)

*Primary Examiner* — Erin B Saad
*Assistant Examiner* — Carlos J Gamino
(74) *Attorney, Agent, or Firm* — WHDA, LLP

(57) ABSTRACT

A low-temperature joining method effectively suppresses reductions in the mechanical properties of a junction of various types of high-tensile steel or aluminum, and of a heat-affected zone; and produces a joint structure. A method for joining two metal materials by forming a joint interface in which the two metal materials face each other at a joint portion and plunge a rotation tool caused to rotate at a prescribed speed into the joint, the method for low-temperature joining of metal materials characterized in that the peripheral velocity of the outermost periphery of the rotation tool is set to 51 mm/s or less, whereby the recrystallization temperature inherent to the metal materials is reduced by introducing a large strain to the joint, and recrystallized (Continued)

grains are generated at the joint interface by setting the joining temperature to less than the recrystallization temperature inherent to the metal materials.

9 Claims, 11 Drawing Sheets

(51) Int. Cl.
*B23K 20/233* (2006.01)
*B23K 103/02* (2006.01)
*B23K 103/10* (2006.01)

(52) U.S. Cl.
CPC .......... *B23K 20/125* (2013.01); *B23K 20/227* (2013.01); *B23K 20/2336* (2013.01); *B23K 2103/02* (2018.08); *B23K 2103/10* (2018.08)

(56) References Cited

FOREIGN PATENT DOCUMENTS

| JP | 2012-40584 | A | 3/2012 |
| JP | 5255781 | B2 | 8/2013 |
| JP | 2015-57292 | A | 3/2015 |

OTHER PUBLICATIONS

International Search Report dated Apr. 11, 2017, issued in counterpart application No. PCT/JP2017/007677. (1 page).

* cited by examiner

[FIG. 1]
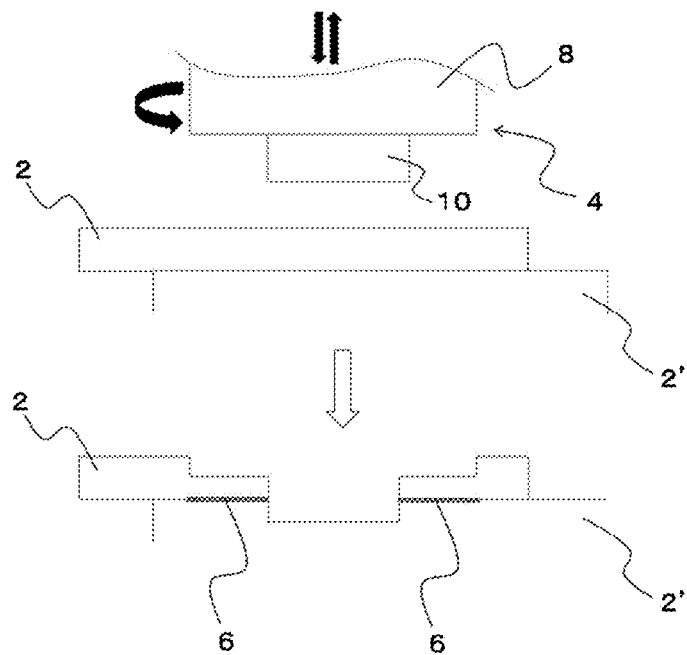
[FIG. 2]
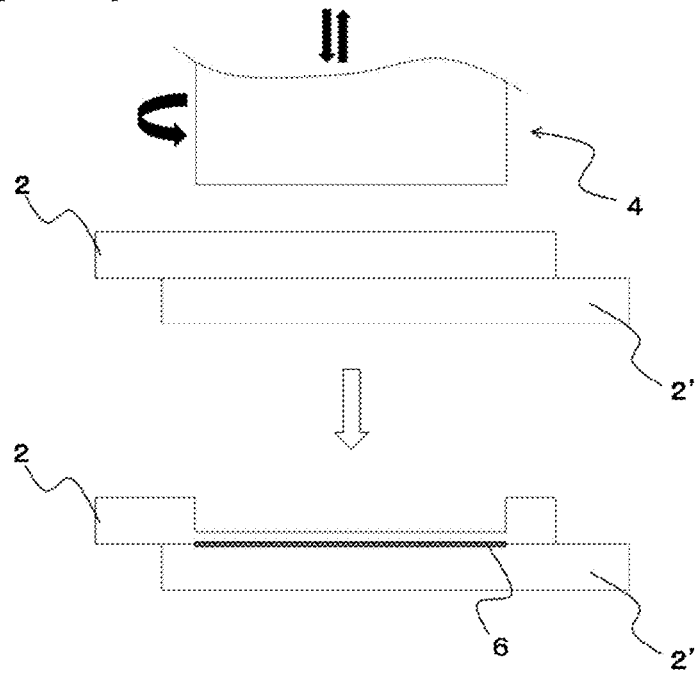

[FIG. 3]
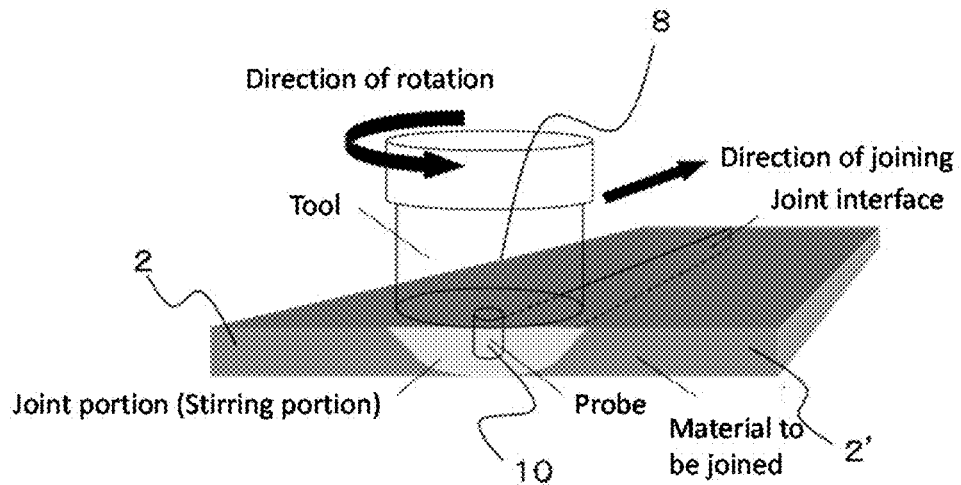
[FIG. 4]
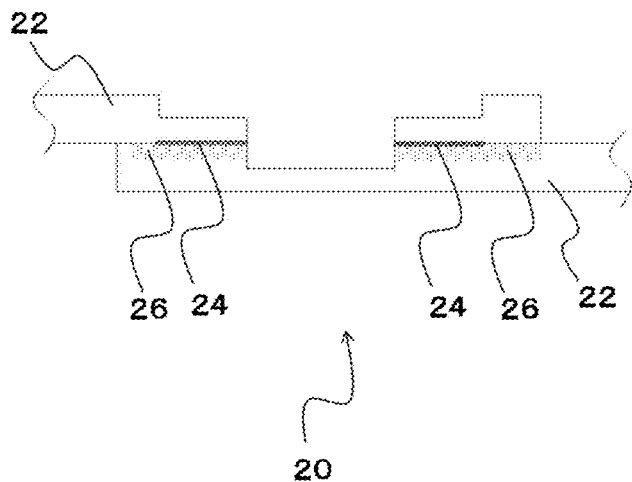
[FIG. 5]
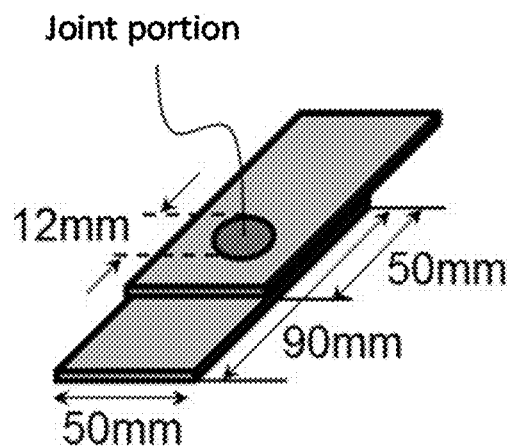

[FIG. 6]
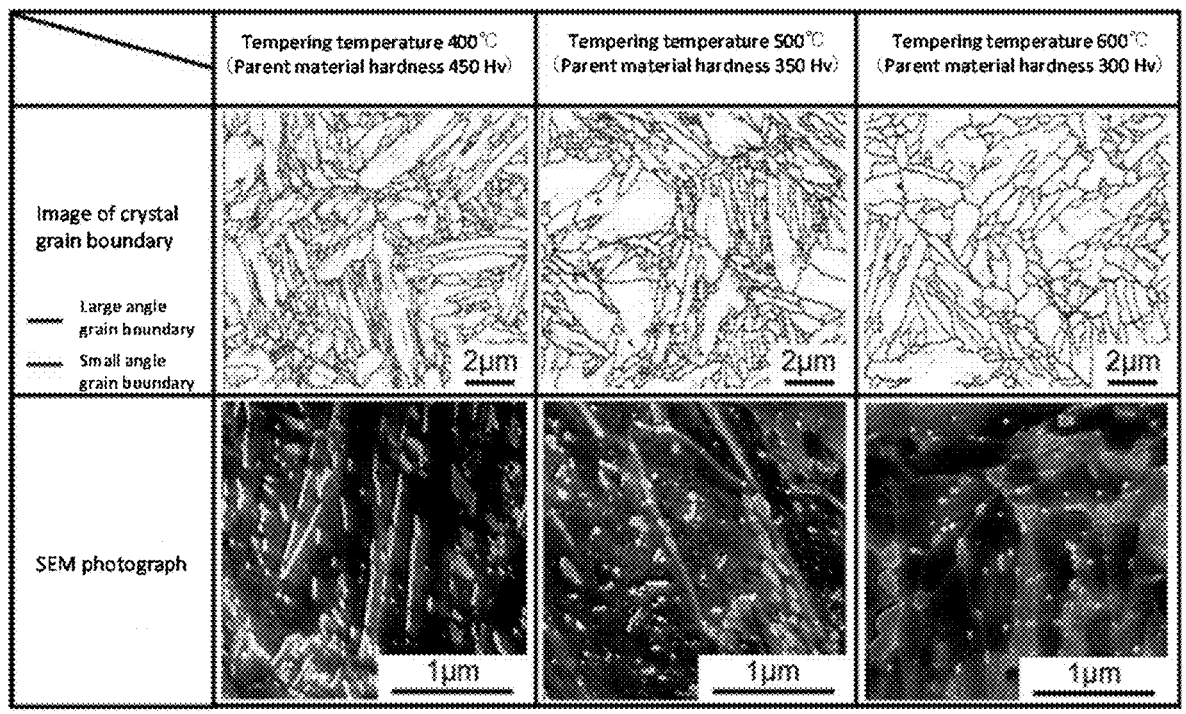
[FIG. 7]
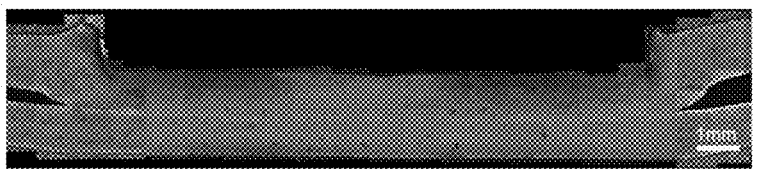
[FIG. 8]
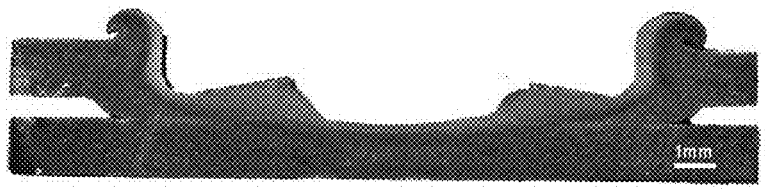

[FIG. 9]
Probe portion
[FIG. 10]
[FIG. 11]
[FIG. 12]
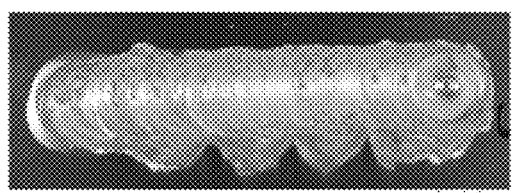
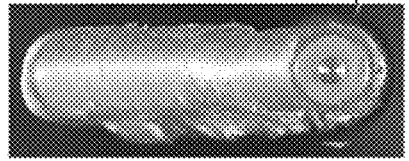
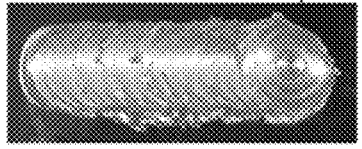

[FIG. 13]
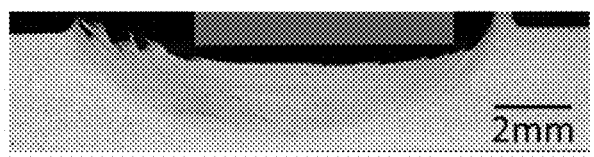
[FIG. 14]
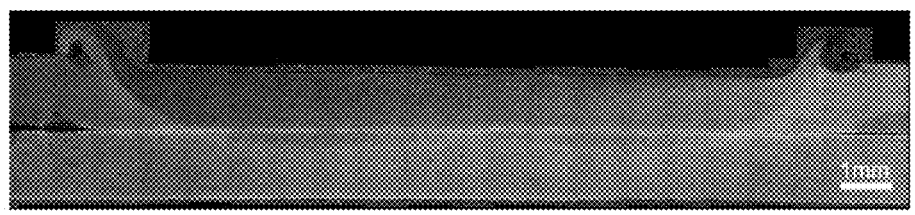
[FIG. 15]
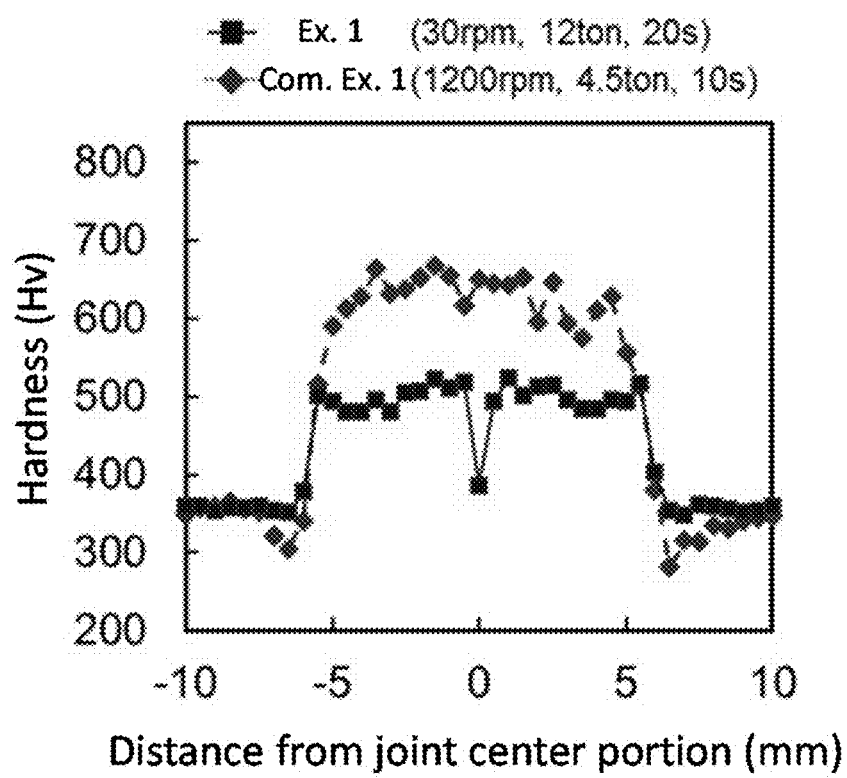

[FIG. 16]
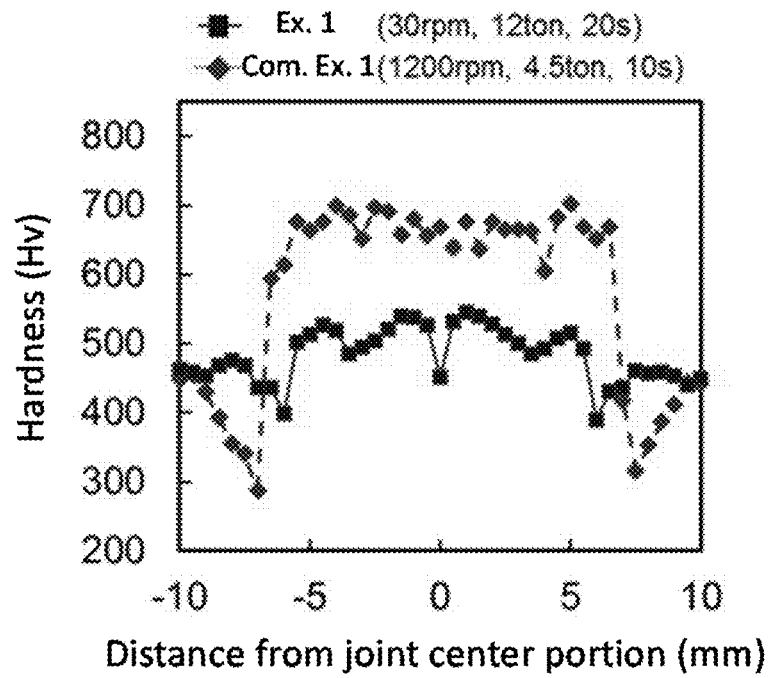
[FIG. 17]
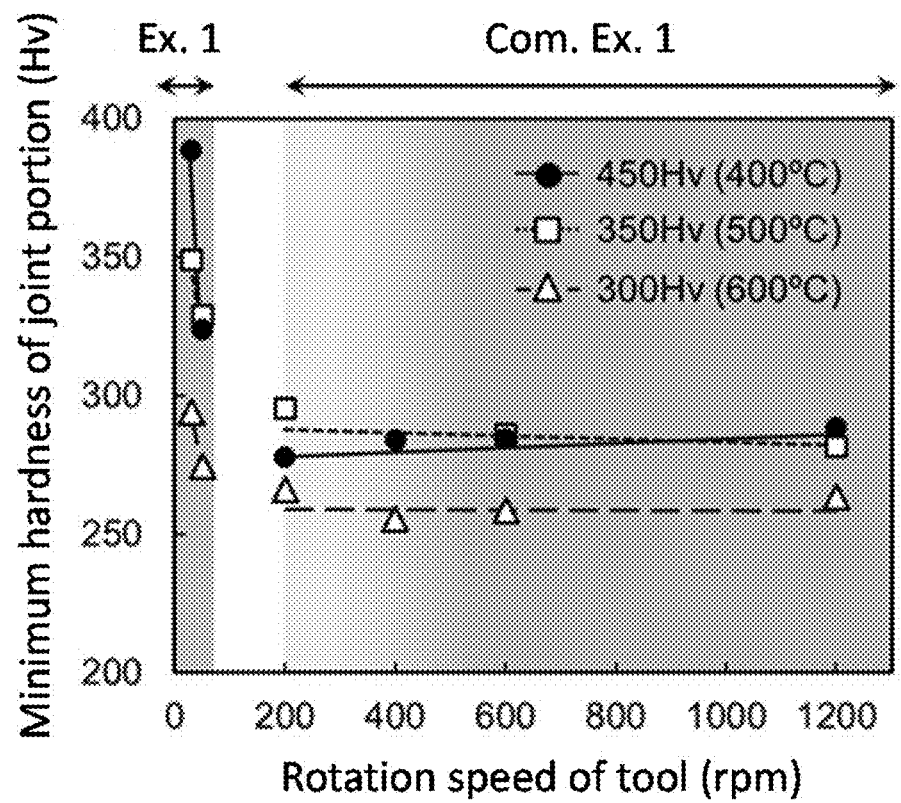

[FIG. 18]
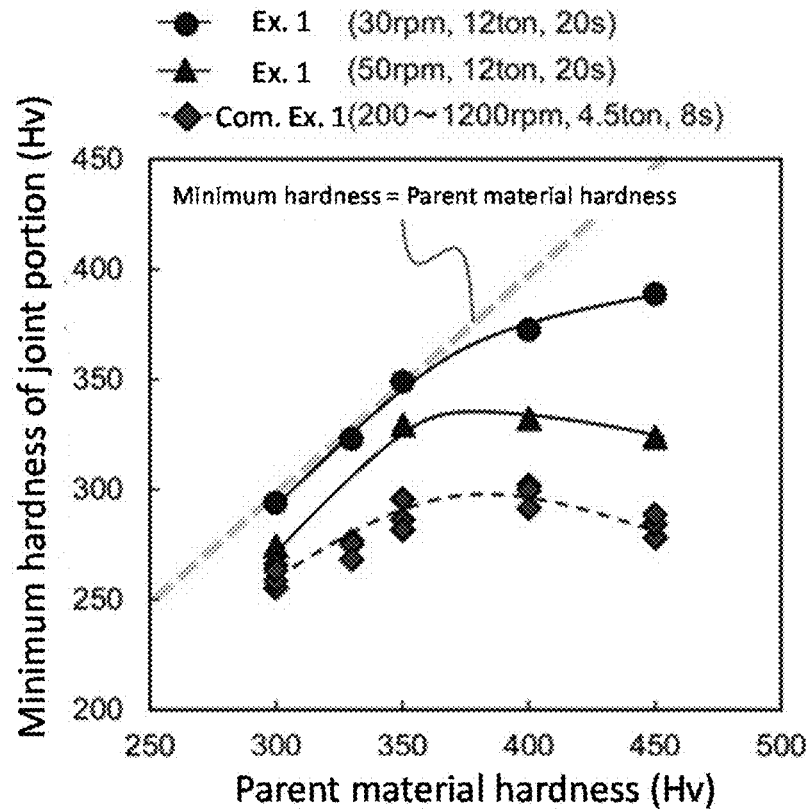
[FIG. 19]
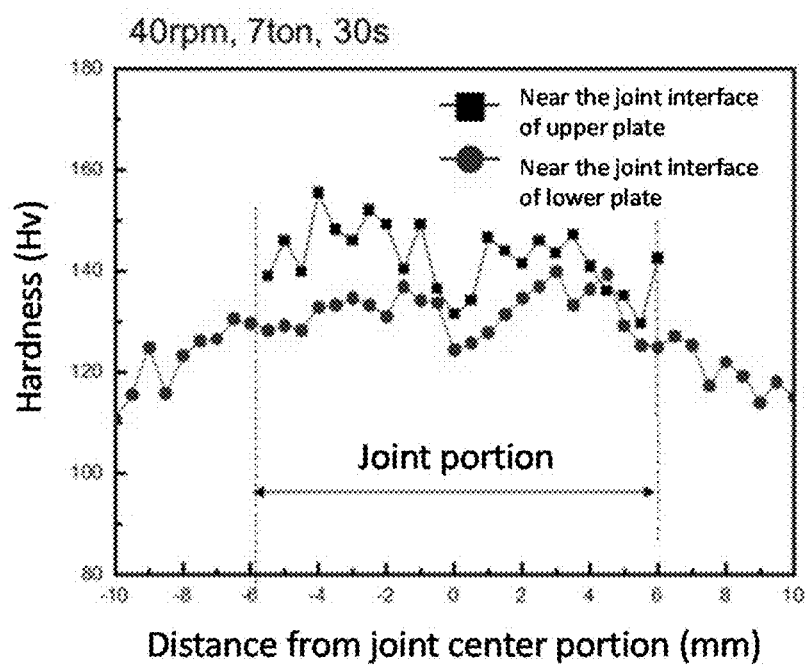

[FIG. 20]
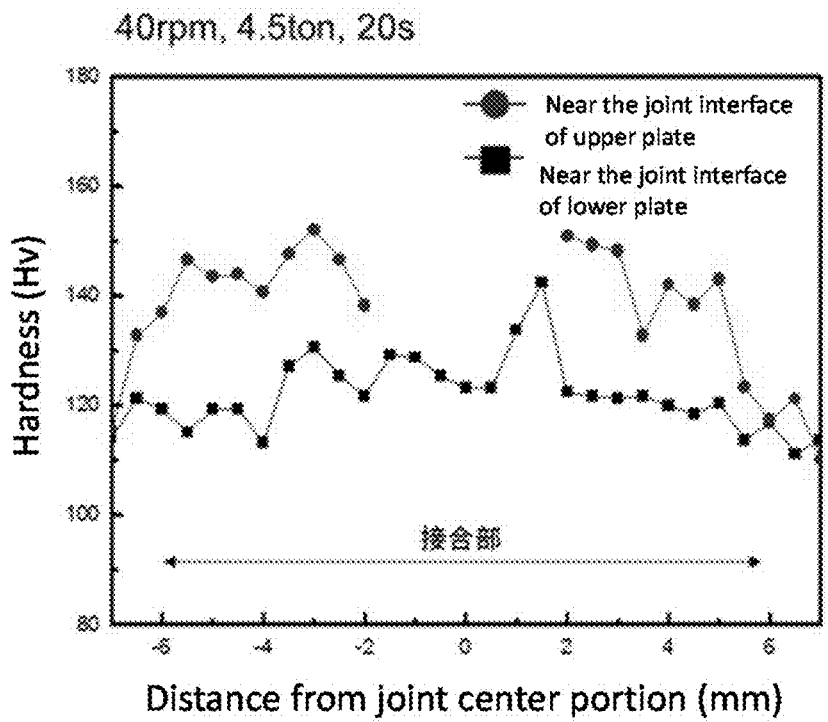
[FIG. 21]
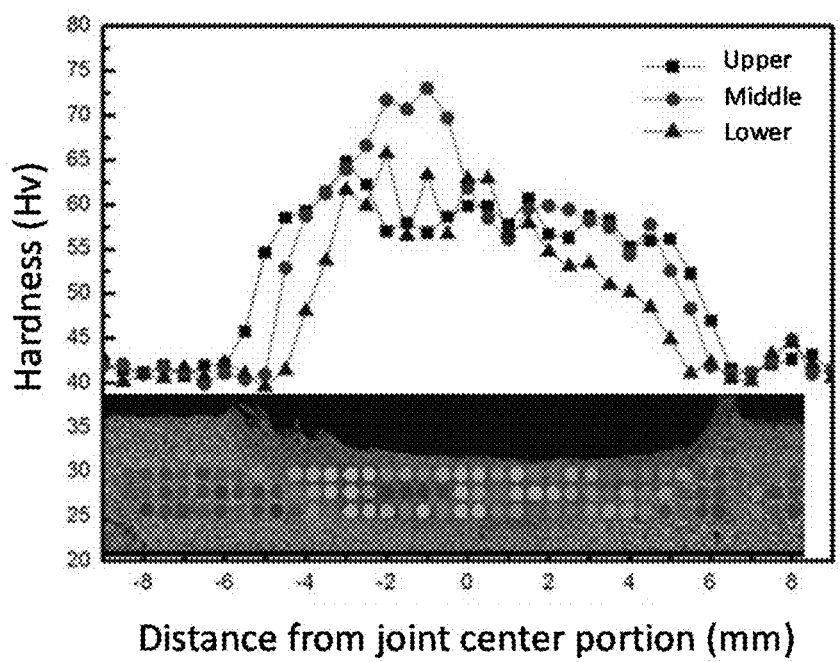

[FIG. 22]
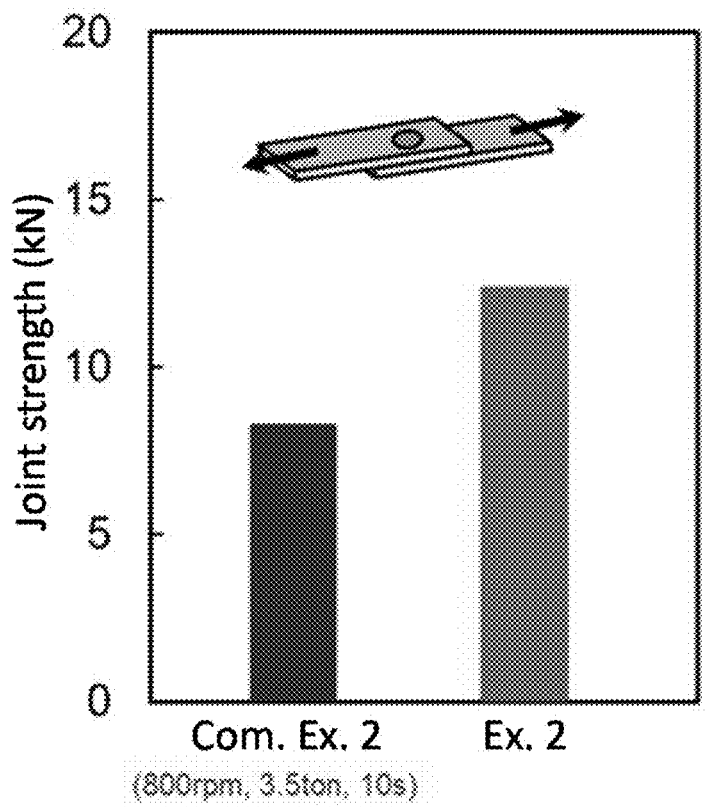
[FIG. 23]
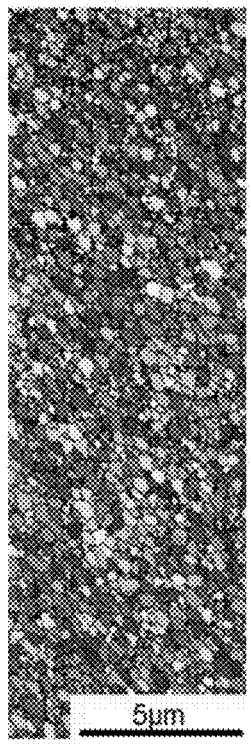

[FIG. 24]
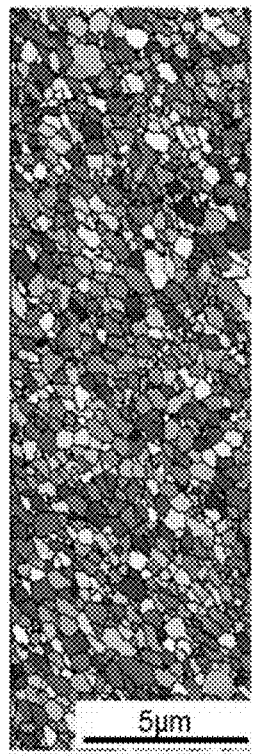
[FIG. 25]
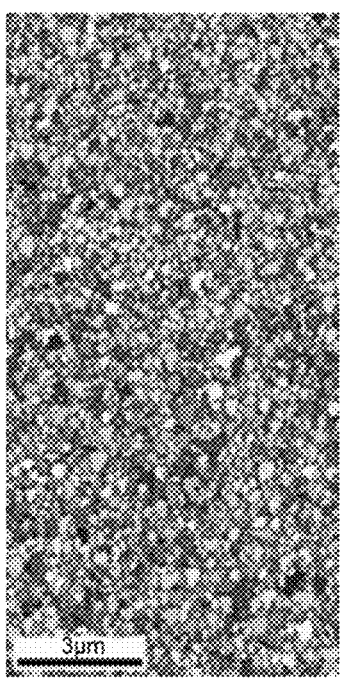

[FIG. 26]
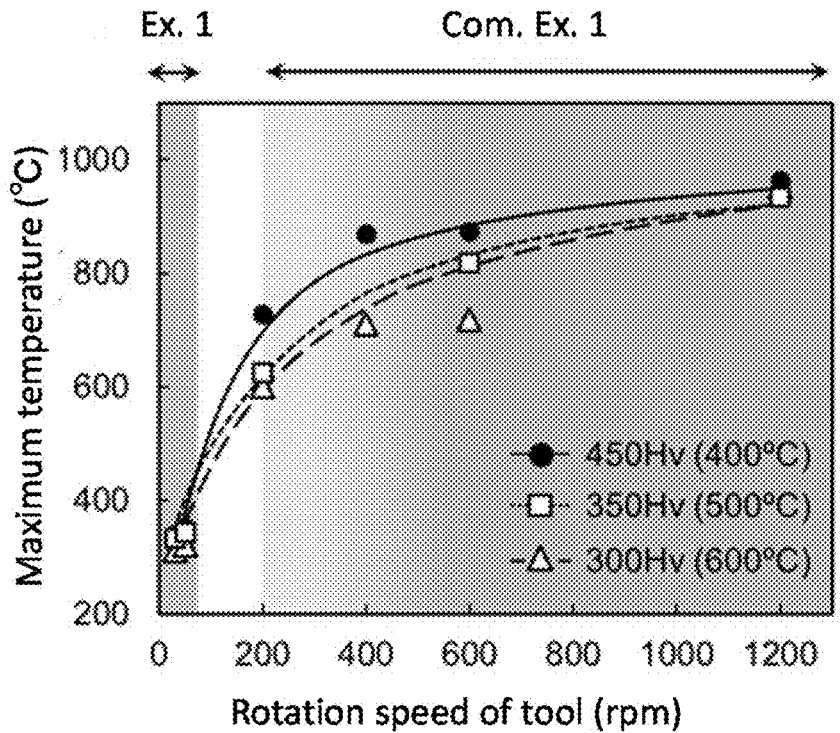
[FIG. 27]
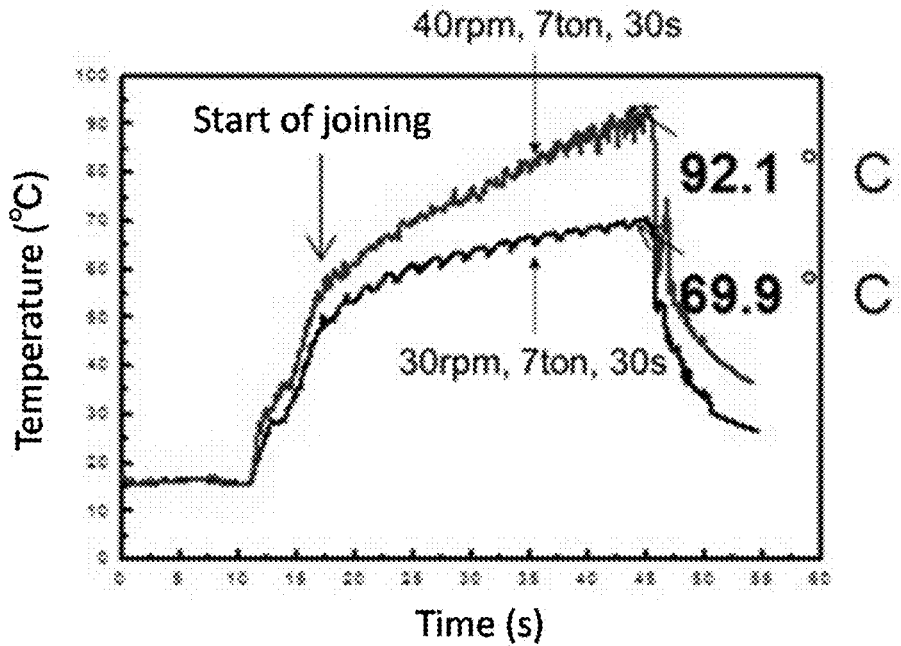

METHOD FOR LOW-TEMPERATURE JOINING OF METAL MATERIALS, AND JOINT STRUCTURE

TECHNICAL FIELD

The present invention relates to a low-temperature joining method for directly joining metal materials and a joint structure obtained by the low-temperature joining method, and more specifically, to a low-temperature joining method for effectively suppressing deterioration of mechanical properties in a joint portion and a heat-affected zone, and a joint structure obtained by the low-temperature joining method.

BACKGROUND ART

Along with increase in strength of metal materials such as steel and aluminum alloy, the reduction in strength at a joint portion which determines the mechanical properties of the joint structure becomes a serious problem. On the other hand, in recent years, the highest attained temperature during the joining has not reached the melting point of the material to be joined, attention has been paid to friction stir welding in which the reduction in strength at the joint portion is smaller than that of the conventional melt welding, and rapid realization has progressed.

However, even in the case of using friction stir welding, which is a solid phase joining, it is difficult to suppress reduction in strength at the joint portion with respect to a high-tensile steel or a heat-treatment type aluminum alloy, and the mechanical properties inherent in the metal material are not sufficiently utilized.

Here, for example, Patent Document 1 (JP2005-131679A) discloses a method of friction stir welding of a heat-treatment type aluminum alloy material, wherein, the heat treatment type aluminum alloy is subjected to T4 tempering treatment, and then to a reversion treatment, and then, the heat treatment type aluminum alloy which is subjected to the recovery treatment, and then the heat treatment type aluminum alloy which is in the recovery state is subjected to the friction stir welding.

In the friction stir welding method described in the above Patent Document 1, the joint can be constituted such that a hardness of the parent material is the smallest among the stirring joint portion, the heat-affected zone and the parent material, and the breakage at the stirring joint portion and the heat-affected zone can be prevented, which gives advantageously a joint material which is excellent in ductility and eventually in press molding ability.

In addition, in Patent Document 2 (JP2015-057292A), there is disclosed a friction stir welding method of metal materials wherein at least one of the materials to be jointed of which has 300° C. or less of recrystallization temperature and has a face-centered cubic lattice structure, are brought into contact with each other at a joint portion, a bar-like tool which rotates is inserted into the joint portion, and then a cooled coolant is supplied to the joint portion and, by moving the tool, the materials to be joined are joined by a friction stir joint step.

In the friction stir welding method described in the above Patent Document 2, it is possible to form an agitating portion which is composed of fine equiaxed grains sufficiently contains dislocations by forced cooling with a coolant, so that even if the metal has a recrystallization temperature of 300° C. or less and a face-centered cubic lattice structure, it is possible to obtain a joint strength equal to or higher than that of the parent material.

PRIOR ART DOCUMENT

Patent Document
  Patent Document 1: JP2005-131679A
  Patent Document 2: JP2015-057292A

SUMMARY OF THE INVENTION

Problem to be Solved by the Invention

However, in the friction stir welding method disclosed in the above Patent Document 1, since the hardness of the joint portion can be increased relatively by lowering the hardness of the parent material by the heat treatment, it is impossible to utilize mechanical properties which the aluminum alloy inherently possesses.

Further, in the friction stir welding method disclosed in the above Patent Document 2, it is impossible to completely suppress the decrease in strength at the joint portion of the high-tensile steel, and in addition, it is necessary to prepare the coolant and the coolant supplying mechanism.

In view of the problems in the prior art as described above, an object of the present invention is to provide a simple low-temperature joining method capable of effectively suppressing deterioration of mechanical properties in a joint portion and a heat-affected zone of various high-tensile steels and aluminum alloys, and a joint structure obtained by the low-temperature joining method.

Means to Solve the Problems

In order to realize the above object, as a result of the intensive study as to a method for forming recrystallized grains at a joint interface and then joining, the present inventors have found that it is quite effective that, by introducing a strong strain at a joint interface and suppressing a temperature rise, or the like, and then have completed the present invention.

Namely, the present invention provides
a low-temperature joining method of metal materials by forming a joint interface in which two metal materials face each other at a joint portion and plunge a rotation tool caused to rotate at a prescribed speed into the joint portion; the method characterized in that:
the peripheral velocity of the outermost periphery of the rotation tool is set to 51 mm/s or less, whereby a recrystallization temperature inherent to the metal materials is reduced by introducing a large strain to the joint portion, and
recrystallized grains are generated at the joint interface by setting the joining temperature to less than the recrystallization temperature inherent to the metal materials.

In order to suppress the reduction in strength of the heat-affected zone, it is preferable to lower the joining temperature. Here, though, in the conventional friction stir welding, the joining temperature rises to about 70% of a melting point (K) of the material to be joined, according to the low-temperature joining method of the present invention, by rotating at an unexpectedly low rotation speed in the conventional friction stir welding, suppressing the rise in the joining temperature and, at the same time, introducing a strong strain, the joining temperature can be set to a temperature less than the recrystallization temperature inherent to the metal material to be joined, thereby, it is possible to suppress a decrease in strength of the heat-affected zone. Here, by setting the peripheral velocity of the outermost periphery of the rotation tool to 51 mm/s or less, it is possible to suppress an increase in joining temperature due to increase in applied load of the rotation tool. The "recrystallization temperature inherent to the metal material" differs depending on the metal material, but it is generally about 40% of the melting point (K) of the metal material.

In addition, by setting the joining temperature being lower than the recrystallization temperature inherently to the metal material as the material to be joined, it is possible to reduce the recrystallized grain size of the stirring portion formed by plunging the rotation tool, and by such finely divided grains, the mechanical properties of the stirring portion can be improved.

In the low-temperature joining method of the metal material of the present invention, it is preferable that the grain size of the recrystallized grains is 1 µm or less by decreasing the rotation speed and increasing the applied load to lower the joining temperature.

It is known that the joining temperature in general friction stir welding is closely related to the rotation speed, applied load and moving speed of a rotation tool to be plunged, and the joining temperature rises as increase in rotation speed and applied load and decrease in moving speed. On the other hand, the present inventors have found that when the rotation speed is set to be extremely small, the joining temperature does not rise greatly even if the applied load is increased, whereas the strain introduced near the joint interface remarkably increases remarkably as the increase in applied load.

The moving speed of the rotation tool may properly be set from the viewpoints of defect formation and joining speed in the stirring portion, and the like, and in the case of spot joining, the pushing and withdrawing speed of the rotation tool may be adjusted, and in the case of line joining, the moving speed on the joint interface may be adjusted. Further, the shape of the rotation tool is not particularly limited as long as the effect of the present invention is not impaired, and various conventionally known shapes of friction stir welding tool can be used. In general, a bar-like rotation tool is used, but, for example, a disk-shaped rotation tool may also be used.

The low-temperature joining method of the present invention is clearly different from the conventional friction stir welding from the viewpoints of joining conditions, joining mechanism, and the like, and when introducing a large strain near the joint interface at a low temperature, the temperature at which the recrystallization occurs really is lowered to lower than the "recrystallization temperature inherent to the metal material", by forming the recrystallized grains in the joint interface at a temperature lower than the "recrystallization temperature inherent to the metal material" where the formation of the heat-affected zone is suppressed, which gives good joining.

The low-temperature joining method of the present invention includes the following (1) to (4) manners and the combination thereof; (1) joining in which the end portions of the metal plates are abutted to each other to form a joint portion, and the metal plates are joined to each other by moving the rotation tool while rotating along the longitudinal direction of the processing portion; (2) spot joining in which the end portions of the metal plates are abutted to each other to form a joint portion, and the metal plates are joined to each other by rotating the rotation tool at the joint portion without moving; (3) spot joining in which the metal plates are superimposed at the joint portion, a rotation tool is inserted into the joint portion, and the metal plates are joined to each other at the place by rotating the rotation tool without moving; (4) joining in which the metal plates are superimposed at the joint portion, a rotation tool is inserted into the joint portion, and the metal plates are joined to each other by moving the rotation tool while rotating along the longitudinal direction of the processing portion.

In the low-temperature joining method of the present invention, the peripheral velocity of the outermost periphery of the rotation tool is preferably 32 mm/s or less, more preferably 19 mm/s or less. When setting the peripheral velocity of the outermost periphery of the rotation tool to 32 mm/s or less, it is possible to suppress the temperature rise near the joint interface and to reduce the joining temperature to less than the recrystallization temperature inherent to the metal material. Further, when setting the peripheral velocity of the outermost periphery of the rotation tool to 19 mm/s or less, it is possible to suppress the rise in the joining temperature more reliably.

Further, in the low-temperature joining method of the present invention, it is preferable that the applied load is not less than a value at which the rotation tool can be pressed into the metal material without rotating the rotation tool. Though, in general friction stir welding, the rotation tool is plunged by utilizing softening of the material to be joined caused by frictional heat, in the low-temperature joining method of the present invention, since the increase in joining temperature is suppressed, it is necessary to plunge the rotation tool in a manner of plastically deforming the material to be joined. Further, when plunging the rotation tool into the material to be joined with a large load, it is possible to introduce a large strain to the joint interface.

In the low-temperature joining method of the present invention, it is preferable that, in the range where a stress applied to the metal material from the rotation tool is equal to or higher than the yield stress of the metal material at the temperature of the joint portion, the applied load is lowered as the temperature of the joint portion rises. Since the yield stress of the metal material is lowered as the temperature rises, the minimum required load for plunging the rotation tool into the metal material also is lowered as the temperature rises. In other words, as long as the rotation tool can be plunged into the metal material, it is possible to achieve the joining by saving energy at a low temperature by applying as small the applied load as possible.

In the low-temperature joining method of the present invention, the metal material is preferably aluminum or an aluminum alloy, and it is more preferable that the metal material is a heat-treatment type aluminum alloy, a process-reinforcement type aluminum or a process-reinforcement type aluminum alloy. When using aluminum or an aluminum alloy as the material to be joined, it is possible to suppress the reduction in strength of the joint portion due to increase in crystal grain size and recovery, and when using a heat-treatment type aluminum alloy, it is also possible to suppress the reduction in strength due to coarsening of the precipitant and solid solution. Further, when using the process-reinforcement type aluminum or the process-reinforcement type aluminum alloy as the material to be joined, it is possible to more effectively suppress the reduction in strength due to recovery and recrystallization. The low-temperature joining method of the present invention can be suitably applied to join different materials, and in the case of joining different materials, it is sufficient if at least one of the materials to be joined has the features of the present invention.

In the low-temperature joining method of the present invention, the metal material is preferably an iron-based metal, more preferably a high-tensile steel. When the material to be joined is a high-tensile steel, it is possible to suppress the formation of the heat-affected zone, which is a problem in the conventional joining technique, and in particular, when applying the low-temperature joining method of the present invention to a high-tensile steel material having a parent material hardness of less than 350 HV, it is possible to obtain a joint portion having a hardness substantially equal to the parent material hardness (almost no reduction in hardness).

As the material to be joined in the low-temperature joining method of the present invention, it is preferable to use the above-mentioned metal material, and also it is preferable to use in an ordinary friction stir welding (friction stir welding where the joining temperature is about 70 to 80% of the melting point of the material to be joined), it is preferable to use a metal whose strength of the joint portion (stirring portion, heat-treatment affected zone and heat-affected zone) is less than the parent material strength. When using the low-temperature joining method of the present invention, strength reduction of the metal material can be effectively suppressed.

Further, since the low-temperature joining method of the present invention is achieved at an extremely low temperature compared with the conventional joining method, it is possible to suitably apply to the joining of different materials, where the formation of intermetallic compounds at the joint interface is a problem, and for example, it can be suitably used for joining different materials of an aluminum material and a magnesium material, and joining different materials of an aluminum material and a steel material.

Further, in the low-temperature joining method of the present invention, it is preferable that the rotation tool is made of an iron-based metal. Regarding the conventional friction stir welding, when the steel material to be welded, the life of the rotation tool is a big problem. On the other hand, though various rotation tools made of metals having a high melting point and ceramics are studied, the tools are expensive in addition to insufficient lifetime.

When the present inventors paid attention to the joining temperature of the low-temperature joining method of the present invention and produced a rotation tool of an iron-based metal having a strength higher than steel as a material to be joined at the joining temperature, and as a result, it is possible to join the steel material by using the rotation tool of the iron-based metal. When using the iron-based rotation tool, compared with the rotation tool conventionally used for friction stir welding of steel, joining can be achieved with the extremely cheap rotation tool.

Further, the present invention provides a joint structure comprising;

a joint portion of a high-tensile steel material having a parent material hardness of less than 350 HV, fine equiaxed recrystallized grains having an average grain size of 1 µm or less in the joint portion, and a hardness of the joint portion and a hardness of the heat-affected zone are approximately equal to or higher than the parent material hardness.

The joint portion of the joint structure of the present invention is not mechanically joined but is metallurgically joined. Basically, the joint portion is composed of fine equiaxed recrystallized grains having substantially the same composition as the high-tensile steel material as the material to be joined, and the average grain size of the equiaxed recrystallized grains is 1 µm or less, which shows the mechanical properties of the joint portion are not inferior to those of the parent material.

Generally, a heat-affected zone is formed at the joint portion of the high-tensile steel material, and the hardness of the heat-affected zone is lower than that of the parent material, but, in the joint structure of the present invention, the hardness of the heat-affected zone is equal to or higher than the parent material hardness. As a result, the strength, reliability and the like of the joint structure of the present invention are not determined by the joint portion, and the mechanical properties of the high-tensile steel material can be fully utilized.

The present invention also provides a joint structure, comprising:

at least one or more of base material parts and a joint portion where the base material parts are joined to each other, wherein the base material part is a high-tensile steel material or a heat-treatment type aluminum alloy material, a composition of the joint portion is almost the same as the composition of the base material, the joint portion includes fine equiaxed recrystallized grains having an average grain size of 1 µm or less, and a hardness of the joint portion and an hardness of the heat-affected zone are approximately 80% or more of the base material part.

In the joint structure of the present invention, the joint portion is not mechanically formed, but metallurgical joining is achieved. Regarding high tensile strength steel materials and heat treatment type aluminum alloy materials, considerable deterioration of mechanical properties at the joint portion becomes a serious problem, but in the joint structure of the present invention, due to the fine equiaxed recrystallized grains having an average grain size of 1 µm or less, the joint interface is disappeared, and the hardness of the joint portion and the hardness of the heat-affected zone is approximately 80% or more of the base material part.

Here, since the recrystallized grain size varies depending on the histories of temperature and strain, though it depends on the place of observation, it may be sufficient if there is a region where an average grain size is 1 µm or less near the joint interface. The average grain size may be calculated, for example, according to an intercept method for an observation image obtained by an optical microscope or a scanning electron microscope.

In the joint structure of the present invention, it is preferable that the base material part is a high-tensile steel material having a parent material hardness of 350 HV or more. In the case of using the conventional welding technique, it is inevitable that the joint portion and the heat-affected zone of the high-tensile steel material having the parent material hardness of 350 HV or more are reduced in hardness, but in the joint structure of the present invention, even when a high-tensile steel material having such a high tensile strength is used for the base material part, the hardness reduction of the joint portion and the heat-affected zone are effectively suppressed.

In the joint structure of the present invention, it is preferable that the base material part is a high-tensile steel material having a parent material hardness of 350 HV or more, and a hardness of the joint portion and a hardness of the heat-affected zone are equal to or more than the parent material hardness. When using the high tensile steel material having the hardness of less than 350 HV for the base material part, the hardness reduction of the joint part and the heat-affected zone is almost completely suppressed.

Furthermore, in the joint structure of the present invention, it is preferable that the base material part is a heat-treatment type aluminum alloy material, and a hardness of the joint portion and a hardness of the heat-treatment zone are equal to or more than approximately 90% of the parent material hardness. Even though the hardness of the heat-treatment type aluminum easily deteriorates due to the temperature rise at the time of welding, in the case that the heat-treatment type aluminum alloy material is used for the base material part, approximately 90% or more of the hardness of the joint part and the hardness of the heat-treated part can be maintained.

The joint structure of the present invention can be suitably produced by the aforementioned low-temperature joining method for joining the metal materials of the present invention.

Effects of the Invention

According to the present invention, it is possible to provide a simple low-temperature joining method capable of effectively suppressing deterioration of mechanical properties in various joint portions and heat-affected zones of the high-tensile steel and aluminum, and a joint structure obtained by the low-temperature joining method.

BRIEF DESCRIPTION OF THE DRAWINGS

FIG. 1 is a schematic view showing one embodiment of a low-temperature joining method for joining the metal materials of the present invention.

FIG. 2 is a schematic view showing other embodiment of the low-temperature joining method for joining the metal materials of the present invention.

FIG. 3 is a schematic view showing a situation during butt joining (line joining).

FIG. 4 is a schematic cross-sectional view near the joint portion in the joint structure of the present invention.

FIG. 5 is a schematic diagram showing the arrangement of the materials to be joined at spot joining.

FIG. 6 is SEM photographs and EBSD crystal grain boundary images of the carbon steel sheet which is subjected to tempering treatment at each temperature.

FIG. 7 is a cross-sectional photograph of the joint portion obtained in Example 1.

FIG. 8 is a cross-sectional photograph of the joint portion obtained in Example 2.

FIG. 9 is a cross-sectional photograph of the joint portion obtained in Example 3.

FIG. 10 is a cross-sectional photograph of the joint portion obtained in Example 4.

FIG. 11 is a cross-sectional photograph of the joint portion obtained in Example 5.

FIG. 12 is photographs of the surfaces of the joint portions obtained in Examples 6 to 8.

FIG. 13 is a cross-sectional photograph of the joint portion obtained in Example 6.

FIG. 14 is a cross-sectional photograph of the joint portion obtained in Comparative Example 1.

FIG. 15 shows the hardness distribution of the joint portion (horizontal direction in the joint portion) when the parent material hardness is 350 HV.

FIG. 16 shows the hardness distribution of the joint portion (horizontal direction in the joint portion) when the parent material hardness is 450 HV.

FIG. 17 is a graph showing the relationship between the minimum hardness of the joint portion and the rotation speed.

FIG. 18 is a graph showing the relationship between the minimum hardness of the joint portion and the hardness of the parent material hardness.

FIG. 19 shows the hardness distribution of the joint portion (horizontal direction in the joint portion) obtained in Example 3.

FIG. 20 shows the hardness distribution of the joint portion (horizontal direction in the joint portion) obtained in Example 4.

FIG. 21 shows the hardness distribution of the joint portion (horizontal direction in the joint portion) obtained in Example 6.

FIG. 22 shows the shear tensile strength of the joint obtained in Example 2 and Comparative Example 2.

FIG. 23 is an orientation map image near the joint interface obtained in Example 1.

FIG. 24 is an orientation map image near the joint interface obtained in Example 2.

FIG. 25 is an orientation map image near the joint interface obtained in Comparative Example 3.

FIG. 26 is a graph showing the relationship between the maximum joining temperature and the rotation speed of the tool.

FIG. 27 is a graph showing the temperature change during joining in Example 3.

MODE FOR CARRYING OUT THE INVENTION

In the following, by referring the drawings, typical embodiments of the friction joining method of the present invention and the joint structure obtained thereby are explained, but the present invention is not limited thereto. In the following explanation, the same symbol is given to the same or corresponding parts, and there is a case where overlapping explanation is omitted. In addition, since these drawings are presented to explain the concept of the present invention, there are cases where size and ratio of the structural elements are different from the real case.

(1) Low-Temperature Joining Method of Metal Materials

The low-temperature joining method of metal materials of the present invention is similar to the friction stir welding method, though the joining mechanism thereof is different. Friction stir welding is a technique called FSW (Friction Stir Welding), where end portions of two materials to be joined made of two metal materials are butted against each other, and a protrusion (probe) provided at the tip of the rotation tool is inserted between the end portions of the two metal members, and the rotation tool is moved along the longitudinal direction of the end portions while rotating the rotation tool, thereby the two metal members are joined.

The low-temperature joining method of metal materials of the present invention includes, as mentioned above, the following (1) to (4) manners and the combination thereof; (1) joining in which the end portions of the metal plates are abutted to each other to form a joint portion, and the metal plates are joined to each other by moving the rotation tool while rotating along the longitudinal direction of the processing portion; (2) spot joining in which the end portions of the metal plates are abutted to each other to form a joint portion, and the metal plates are joined to each other by rotating the rotation tool at the joint portion without moving; (3) spot joining in which the metal plates are superimposed at the joint portion, a rotation tool is inserted into the joint portion, and the metal plates are joined to each other at the place by rotating the rotation tool without moving; (4) joining in which the metal plates are superimposed at the joint portion, a rotation tool is inserted into the joint portion, and the metal plates are joined to each other by moving the rotation tool while rotating along the longitudinal direction of the processing portion, and in the following, the embodiment "(3) spot joining in which the metal plates are superimposed at the joint portion, a rotation tool is inserted into the joint portion, and the metal plates are joined to each other at the place by rotating the rotation tool without moving" is explained in detail as the typical embodiment.

FIG. 1 is a schematic view showing one embodiment of the low-temperature joining method of metal materials of the present invention. A joint portion 6 is formed by overlapping a joint member 2 and a joint member 2', and plunging a rotation tool 4 which is rotated at a low speed from one joint member under a heavy load.

FIG. 1 shows a case where the rotation tool 4 having a columnar protrusion (probe portion) 10 is used on the bottom surface of a columnar body part (shoulder portion) 8, and by plunging the protrusion (probe portion) 10 to such an extent that the protrusion does not penetrate the workpiece 2' disposed on the lower side, the joint portion 6 is formed around the protrusion (probe portion) 10 below the main body part (shoulder portion) 8.

FIG. 2 shows a case where the rotation tool 4 having no protrusion (probe portion) 10 is used on the bottom surface of the columnar body part (shoulder portion) 8, and by plunging the rotation tool 4 to the joint member 2, the joint portion 6 is formed. Here, when the protrusion (probe portion) 10 is not provided, it is preferable that the rotation tool 4 is plunged only into the joint member 2 which is disposed on the upper side, and the joint portion 6 is formed below the bottom face of the rotation tool 4.

In the low-temperature joining method of metal materials of the present invention, the joining temperature is adjusted by using the rotation speed, the applied load, and the moving speed of the rotation tool 4 as parameters for controlling, and the joining temperature is regulated to less than the recrystallization temperature inherent to the materials to be joined (2, 2'). Here, the "recrystallization temperature inherent to the materials to be joined (2, 2')" varies depending on its composition, processing state (degree of processing), etc., and for example, the recrystallization temperatures of exemplified metals are W: 1200° C., Mo: 900° C., Fe: 500° C., Cu: 200 to 230° C., Al: 150 to 240° C. and Mg: 150° C. (Hajime Sudo, "Metallography", Maruzen(1972)). In the present invention, the "recrystallization temperature inherent to metal materials (2, 2')" may be a value conventionally known as a metal material corresponding to the materials to be joined (2, 2'), and if there is no suitable reported value, by observing the structure of the materials to be joined (2, 2') which is heat-treated at each temperature, and the existence of recrystallization is confirmed.

In addition, in the low-temperature joining method of the present invention, the joint is achieved by forming recrystallized grains at the joint interface, and the joining temperature is set to less than the "recrystallization temperature inherent to the materials to be joined (2, 2')" where recrystallization usually does not occur. Here, in the low-temperature joining method of the present invention, by plunging the rotation tool 4 while suppressing the temperature rise as much as possible to introduce a strong strain in the joint portion, the temperature (actual recrystallization temperature) at which recrystallization occurs is lowered. Specifically, by setting the peripheral velocity of the outermost periphery of the rotation tool 4 to 51 mm/s or less, a strong strain is introduced into the joint portion while suppressing the increase in the joining temperature, so that the recrystallization temperature inherent to the metal material is lowered. In the case where the shoulder diameter of the rotation tool 4 is 12 mm, by setting the rotation speed to 80 rpm, the peripheral velocity of the outermost periphery can be set to 51 mm/s. Further, by setting the joining temperature to less than the "recrystallization temperature inherent to the materials to be joined (2, 2')", it is possible to suppress the formation of coarse recrystallized grains in the joined portion and reduction in hardness in the heat-affected zone.

The shape of the rotation tool 4 is not particularly limited as long as the effect of the present invention is not impaired, and various conventionally known shapes of tools for friction stir welding can be used, and it is preferable to use the shape of the columnar body part (shoulder portion) having a columnar protrusion (probe portion) on the bottom surface. When making the bottom surface of the protrusion (probe portion) substantially plan, it is possible to efficiently introduce a strong strain near the joint interface.

Here, the joining temperature can be lowered by lowering the rotation speed of the rotation tool 4 and increasing the applied load, and by setting appropriate rotation speed and applied load, the grain size of the crystal grain in the joint portion can be 1 μm or less.

The rotation speed of the rotation tool 4 is properly regulated so that the joining temperature is less than the "recrystallization temperature inherent to the materials to be joined (2, 2')", and the peripheral velocity of the outermost periphery of the rotation tool is preferably 32 mm/s or less, more preferably 19 mm/s or less. When setting the peripheral velocity of the outermost periphery of the rotation tool to 32 mm/s or less, it is possible to suppress the temperature rise near the joint interface. Further, when setting the peripheral velocity of the outermost periphery of the rotation tool to 19 mm/s or less, it is possible to suppress the rise in the joining temperature more reliably. In the case where the shoulder diameter of the rotation tool 4 is 12 mm, by setting the rotation speed to 50 rpm, the peripheral velocity of the outermost periphery can be set to 32 mm/s, and by setting the rotation speed to 30 rpm, the peripheral velocity can be set to 19 mm/s.

Further, the applied load of the rotation tool 4 is properly regulated so that the joining temperature is less than the "recrystallization temperature inherent to the materials to be joined (2, 2')", and it is preferable that the applied load is not less than a value at which the rotation tool can be pressed into the materials to be joined (2, 2') without rotating the rotation tool 4. Though, in general friction stir welding, the rotation tool 4 is plunged by utilizing softening of the materials to be joined (2, 2') caused by frictional heat, in the low-temperature joining method of the present invention, since the increase in joining temperature is suppressed, it is necessary to plunge the rotation tool 4 in a manner of plastically deforming the materials to be joined (2, 2'). Further, when plunging the rotation tool 4 into the materials to be joined (2, 2') with a large load, it is possible to introduce a large strain to the joint interface.

The materials to be joined (2, 2') are preferably aluminum or an aluminum alloy, and it is more preferable that the materials to be joined (2, 2') are a heat-treatment type aluminum alloy, a process-reinforcement type aluminum or a process-reinforcement type aluminum alloy. When using aluminum or an aluminum alloy as the materials to be joined (2, 2'), it is possible to suppress the reduction in strength of the joint portion due to increase in crystal grain size and recovery, and when using a heat-treatment type aluminum alloy as the materials to be joined (2, 2'), it is also possible to suppress the reduction in strength due to coarsening of the precipitant and solid solution. Further, when using the process-reinforcement type aluminum or the process-reinforcement type aluminum alloy as the materials to be joined (2, 2'), it is possible to more effectively suppress the reduction in strength due to recovery and recrystallization.

The materials to be joined (2, 2') are preferably an iron-based metal, more preferably a high-tensile steel. When the materials to be joined (2, 2') are a high-tensile steel, it is possible to suppress the formation of the heat-affected zone, which is a problem in the conventional joining technique, and in particular, when applying the low-temperature joining method of the present invention to a high-tensile steel material having a parent material hardness of less than 350 HV, it is possible to obtain a joint portion having a hardness substantially equal to the parent material hardness (almost no reduction in hardness).

It is preferable to use an ordinary friction stir welding process (friction stir welding process where the joining temperature is about 70 to 80% of the melting point of the material to be joined). Further, as the materials to be joined (2, 2'), it is preferable to use a metal whose strength of the joint portion (stirring portion, heat-treatment affected zone and heat-affected zone) is less than the parent material strength. When using the low-temperature joining method of the present invention, strength reduction of the metal material can be effectively suppressed. In addition, since the low-temperature joining method of the present invention is achieved at an extremely low temperature compared with the conventional joining method, it is possible to suitably apply to the joining of different materials, where the formation of intermetallic compounds at the joint interface is a problem, and for example, it can be suitably used for joining different materials of an aluminum material and a magnesium material, and joining different materials of an aluminum material and a steel material.

The rotation tool 4 is preferably made of an iron-based metal. Regarding the conventional friction stir welding, when the materials to be joined (2, 2') are made of steel, the life of the rotation tool 4 is a big problem. On the other hand, though various rotation tools 4 made of metals having a high melting point and ceramics are studied, the tools are expensive in addition to insufficient lifetime.

To the contrary, since the joining temperature is as low as less than the "recrystallization temperature inherent to the materials to be joined (2, 2')", it is possible to join the steel by using the rotation tool 4 of the iron-based metal. When using the iron-based rotation tool 4, compared with the rotation tool 4 conventionally used for friction stir welding of steel, the joint can be achieved with the extremely cheap rotation tool 4.

Here, in the case of joining the high-tensile steel material by using the rotation tool 4 made of the iron-based metal, the protrusion (probe portion) is cut by a shearing stress applied to the rotation tool 4 during joining, and is embedded into the joint portion of the materials to be joined (2, 2'). In this case, since the protrusion (probe portion) is filled in the concave portion formed in the joint portion by plunging of the protrusion (probe portion), it is possible to form more preferable joint portion from the viewpoint of joint strength. In addition, since the rotation tool 4 and the materials to be joined (2, 2') are made of the same material, no serious problem is raised concerning environment resistance such as corrosion.

As mentioned above, the low-temperature joining method of the present invention can be applied to a general butt joining, and in such a case, in the manner shown in FIG. 3, it is possible to obtain a good line joint portion by plunging the rotation tool 4 into the region where the materials to be joined (2, 2') are abutted, and moving the rotation tool 4 along the butting line.

(2) Joint Structure

FIG. 4 is a schematic cross-sectional view near the joint portion in the joint structure of the present invention. In FIG. 4, the spot joint portion is shown as a representative embodiment of the joint portion of the joint structure of the present invention.

The joint structure 20 of the present invention has at least one or more of base material parts 22 and a joint portion 24 where the base material parts 22 are joined to each other. The base material part 22 is a high-tensile steel material or a heat-treatment type aluminum alloy material, and the composition of the joint portion 24 is almost the same as the composition of the base material 22. That is, in the formation of the joint portion 24, no other element is positively added.

The joint portion 24 includes fine equiaxed recrystallized grains having an average grain size of 1 μm or less, and particularly the joint interface is formed by the formation of the fine equiaxed recrystallized grains. Further, due to formation of the fine equiaxed recrystallized grains in the joint portion, the hardness of the joint portion 24 and the hardness of the heat-affected zone 26 is approximately 80% or more of the base material part 22.

The joint portion 24 is not mechanically formed, but metallurgical joining is achieved. Regarding high tensile strength steel materials and heat treatment type aluminum alloy materials, considerable deterioration of mechanical properties at the joint portion 24 becomes a serious problem, but in the joint structure 20 of the present invention, due to the fine equiaxed recrystallized grains having an average grain size of 1 μm or less, the joint interface is disappeared, and the hardness of the joint portion 24 and the hardness of the heat-affected zone 26 is approximately 80% or more of the base material part.

In the joint structure 20, it is preferable that the base material part 22 is a high-tensile steel material having a parent material hardness of 350 HV or more. In the case of using the conventional welding technique, it is inevitable that the joint portion 24 and the heat-affected zone 26 of the high-tensile steel material having the parent material hardness of 350 HV or more are reduced in hardness, but in the joint structure 20, even when a high-tensile steel material having such a high tensile strength is used for the base material part 22, the hardness reduction of the joint portion 24 and the heat-affected zone 26 are effectively suppressed.

In the joint structure 20, it is preferable that the base material part 22 is a high-tensile steel material having a parent material hardness of 350 HV or more, and a hardness of the joint portion 24 and a hardness of the heat-affected zone 26 are equal to or more than the parent material hardness. When using the high tensile steel material having the hardness of less than 350 HV for the base material part 22, the hardness reduction of the joint portion 24 and the heat-affected zone 26 is almost completely suppressed.

Furthermore, in the joint structure 20, it is preferable that the base material part 22 is a heat-treatment type aluminum alloy material, and a hardness of the joint portion 24 and a hardness of the heat-treatment zone 26 are equal to or more than approximately 90% of the parent material hardness. Even though the hardness of the heat-treatment type aluminum easily deteriorates due to the temperature rise at the time of welding, in the case that the heat-treatment type aluminum alloy material is used for the base material part 22, approximately 90% or more of the hardness of the joint part 24 and the hardness of the heat-treated part 26 can be maintained.

In the above, the representative embodiments of the present invention are explained, but the present invention is not limited only to those embodiments, and various modifications and changes are possible, and all of such modifications and changes are included in the scope of the present invention.

EXAMPLE

Example 1

In the arrangement shown in FIG. 5, carbon steel plates (JIS-S45C) were superimposed on each other, and were subjected to spot joining by plunging the rotation tool from the upper carbon steel plate. Here, as the rotation tool, a cylindrical tool ($\varphi$ 12 mm, no probe) made of WC—Ni cemented carbide was used, and the thickness of the carbon steel plate was 1.0 mm or 1.5 mm. The rotation speed of the rotation tool was 30 rpm or 50 rpm, the applied load was 12 ton or 15 ton, and the joining time was 10 seconds or 30 seconds. As mentioned above, the recrystallization temperature of Fe is to 500° C. and the recrystallization temperature of the carbon steel S45C is about 600° C.

The carbon steel sheet used as the test material changes the hardness (strength) by tempering treatment at each temperature of 400° C., 500° C., and 600° C. FIG. 6 shows SEM photographs and EBSD crystal grain boundary images of the carbon steel sheets subjected to the tempering treatment at each temperature. For SEM observation and EBSD measurement, FE-SEM (JSM-7001FA available from JEOL Ltd.) and OIM data Collection ver. 5.31 available from TSL were used.

In FIG. 6, reduction of small angle grain boundary and carbide as the elevation of the tempering temperature were observed, and the hardness was 450 HV in the case of 400° C., 350 HV in the case of 500° C. and 300 HV in the case of 600° C. In general, since a tensile strength (MPa) is about 3 times of a Vickers hardness, the tempered carbon steels correspond to high tensile steels having a tensile strength of 1350 MPa at 400° C., 1050 MPa at 500° C. and 900 MPa at 600° C.

Example 2

The spot joining was achieved in the same manner as in Example 1 except that a cylindrical tool ($\varphi$ 12 mm, probe: $\varphi$ 4 mm, length 1.8 mm) made of a tool steel (Hitachi Metals, YXR33) was used as the rotation tool, the rotation speed of the rotation tool was set to 50 rpm, the load was set to 15 ton, and the joining time was set to 10 seconds.

Example 3

The spot joining was achieved in the same manner as in Example 1 except that a cylindrical tool ($\varphi$ 12 mm, probe: $\varphi$ 4 mm, length 1.8 mm) made of a tool steel (JIS-SKD61) was used as the rotation tool, a low carbon steel plate (JIS-SPCC) was used as the joint member, the rotation speed of the rotation tool was set to 50 rpm, the load was set to 6 ton, and the joining time was set to 60 seconds.

Example 4

In the arrangement shown in FIG. 5, aluminum alloy plates (JIS-A6061-T6) were superimposed on each other, and were subjected to spot joining by plunging the rotation tool from the upper aluminum alloy plate. Here, as the rotation tool, a cylindrical tool ($\varphi$ 12 mm, no probe) made of WC—Ni cemented carbide was used, and the thickness of the aluminum alloy plate was 1.0 mm. The rotation speed of the rotation tool was 30 to 50 rpm, the load was 3.5 to 8 ton, and the joining time was 20 seconds or 30 seconds. As mentioned above, the recrystallization temperature of Al is to 150 to 240° C. and the recrystallization temperature of the aluminum alloy A6061 is about 250 to 350° C.

Example 5

The spot joining was achieved in the same manner as in Example 4 except that the shape of the rotation tool was changed to $\varphi$ 12 mm, probe: $\varphi$ 4 mm, length 1 mm).

Example 6

A linear treatment region was formed by plunging and moving a rotation tool into a pure aluminum plate (A1050H24) having a thickness of 3 mm. As the rotation tool, a cylindrical tool ($\varphi$ 12 mm, probe: $\varphi$ 4 mm, length 0.9 mm) made of WC—Ni cemented carbide was used. The rotation speed of the rotation tool was 50 rpm, the moving speed was 10 mm/min, and the friction stir processing was performed under the position control of the rotation tool.

Example 7

The friction stir processing was achieved in the same manner as in Example 6 except that the rotation speed was 10 rpm.

Example 8

The friction stir processing was achieved in the same manner as in Example 6 except that the rotation speed was 5 rpm.

Comparative Example 1

The spot joining was achieved in the same manner as in Example 1 except that the rotation speed was set to 200 to 1200 rpm, the load was set to 4.5 ton, and the joining time was set to 10 seconds.

Comparative Example 2

The spot joining was achieved in the same manner as in Comparative Example 1 except that a cylindrical tool ($\varphi$ 12 mm, probe: $\varphi$ 4 mm, length 1.8 mm) made of WC—Ni cemented carbide was used as the rotation tool.

Comparative Example 3

The spot joining was achieved in the same manner as in Example 4 except that the rotation speed was set to 2500 rpm, the load was set to 0.4 ton, and the joining time was set to 1.2 seconds.

[Observation of Cross Section of Joint Portion]

In order to confirm the presence or absence of defect formation at the joint portion and the condition of the joining interface, the cross section of the joint portion was observed with an optical microscope.

FIG. 7 shows a cross-sectional photograph of the joint portion (30 rpm, 15 ton, 30 s) obtained in Example 1. A concave portion is formed in the upper carbon steel sheet by plunging of the rotation tool, and the upper carbon steel plate and the lower carbon steel plate are joined below the concave portion. Here, it is understood that no defect or the like is observed in the joint region, and good joining is achieved.

FIG. 8 shows a cross-sectional photograph of the joint portion obtained in Example 2. A concave portion corresponding to the bottom shape of the rotation tool is formed on the upper carbon steel plate by plunging of the rotation tool having a probe, and the upper carbon steel plate and the lower carbon steel plate are joined below the concave portion. Here, it is understood that no defect or the like is observed in the joint region, and good joining is achieved.

FIG. 9 shows a cross-sectional photograph of the joint portion obtained in Example 3. A concave portion corresponding to the bottom shape of the rotation tool is formed on the upper carbon steel plate by plunging of the rotation tool having a probe, and the broken probe portion of the rotation tool is embedded in the concave portion. The upper carbon steel plate and the lower carbon steel plate are joined to each other below the concave portion, and it is understood that no defects or the like is observed in the joint region, and good joining is achieved.

FIG. 10 shows a cross-sectional photograph of the joint portion (40 rpm, 7 ton, 30 s) obtained in Example 4. Similar to the joint portion obtained in Example 1, a concave portion is formed in the upper aluminum alloy plate, and the upper aluminum alloy plate and the lower aluminum alloy plate are joined below the concave portion. Here, no defect or the like is observed in the joint region.

FIG. 11 shows a cross-sectional photograph of the joint portion (40 rpm, 6 ton, 20 s) obtained in Example 5. Similarly to the joining portion obtained in Example 2, a concave portion corresponding to the bottom surface shape of the rotation tool is formed on the upper aluminum alloy plate by plunging of the rotation tool having a probe, and the upper aluminum alloy plate and the lower aluminum alloy plate are joined below the concave portion. Here, it is understood that no defects or the like is observed in the joint region, and good joining is achieved.

FIG. 12 shows photographs of the surfaces of the joint portions obtained in Examples 6 to 8. It can be seen that linear stirring regions are formed under any conditions. Further, friction stirring is satisfactorily achieved, and no groove defect or the like is observed.

FIG. 13 shows a cross-sectional photograph of the joint portion obtained in Example 6. No defect is observed in the cross section photograph, and it is understood that even when the rotation speed of the rotation tool is set extremely slow, a favorable stirring portion is formed.

FIG. 14 shows a cross-sectional photograph of the joint portion (400 rpm, 4.5 ton, 10 s) obtained in Comparative Example 1. Similarly to the joint portion obtained in Example 1, a concave portion is formed in the upper carbon steel plate, and the upper carbon steel plate and the lower carbon steel plate are joined below the concave portion. Here, no defect or the like is observed in the joint region.

[Measurement of Hardness]

The Vickers hardness test was conducted as to the cross sections of the joint portions obtained in the above Examples and Comparative Examples. The Vickers hardness was measured under the conditions of a load of 0.1 kgf and a loading time of 15 s.

FIG. 15 and FIG. 16 show the hardness distribution (horizontal direction of joint portion) when the hardness of the parent material of the carbon steel plate is 350 HV and 450 HV. When the hardness of the parent material of the carbon steel plate is 350 HV, the softened region (heat-affected zone) less than the parent material hardness does not exist in the joint portion obtained in Example 1. In addition, though the slightly softened region exists when the hardness of the parent material of the carbon steel plate is 450 HV, the reduction in hardness is clearly observed as compared with the joined portion obtained in Comparative Example 1.

With respect to the joint portions obtained in Example 1 and Comparative Example 1, FIG. 17 shows the relationship between the minimum hardness of the joint portion and the rotation speed of the rotation tool. The minimum hardness of the joint portion (200 to 1200 rpm) obtained in Comparative Example 1 is a value significantly lower than the hardness of the parent material irrespective of the joining condition, but the minimum hardness of the joint portion obtained in Example 1 shows a high value. In FIG. 17, when the rotation speed is set to 80 rpm, reduction in hardness at the joint portion is effectively suppressed. Particularly, when the rotation speed is set to 50 rpm, the suppression effect is remarkable, and furthermore, when the rotation speed is set to 30 rpm, reduction in hardness from the parent material is hardly observed.

With respect to the joint portions obtained in Example 1 and Comparative Example 1, FIG. 18 shows the relationship between the minimum hardness of the joint portion and the parent material hardness. Reduction in hardness of the joint portion obtained in Comparative Example 1 from the parent material hardness is remarkable, but reduction in hardness of the joint obtained in Example 1 is clearly reduced. Particularly, when the rotation speed is set to 30 rpm, hardness is not reduced until the parent material hardness reaches 350 HV.

FIG. 19 and FIG. 20 show the hardness distribution (horizontal direction of joint portion) of the joint portions obtained in Example 3 and Example 4. Even in the case of using friction stir welding as solid phase joining, though the formation of a softened region (heat-affected zone) was inevitable in the conventional aluminum alloy plate (JIS-A6061-T6) joint, at the joint portions obtained in Example 3 and in Example 4, softened region (heat-affected zone) less than the parent material hardness is not observed.

FIG. 21 shows the hardness distribution (horizontal direction of joint portion) of the joint portion obtained in Example 6. Measurements are made at the upper part, the middle part and the lower part of the stirring part, respectively. The pure aluminum used as the test material is not the O material but the H24 material, but the hardness of the stirring part shows a much higher value than that of the parent material. In addition, at the joint portion, softened region (heat-affected zone) less than the parent material hardness is not observed.

[Tensile Test]

With respect to the joints obtained in the above Examples and Comparative Examples, the shear tensile strength was measured. For the measurement, the shear tensile strength of the joint was measured with a tensile tester (SHIMADZU Autograph AGS-X 10 kN) at a crosshead speed of 1 mm/min.

The shear tensile strengths of the joints obtained in Example 2 and Comparative Example 2 are shown in FIG. 22. Since the joint obtained in Comparative Example 2 is broken at the softened region (heat-affected zone), the shear tensile strength is only about 8 kN. In contrast, the joint obtained in Example 2 in which the softened region (heat-affected zone) is not formed has a shear tensile strength of about 12 kN.

With respect to the joint obtained in Example 3, the shear tensile strength is 5.5 kN when the joining condition is set to 6 ton, 50 rpm, 30 seconds, and the shear tensile strength when the joining condition is 7 ton, 40 rpm, 30 seconds is 4.8 kN. In contrast, with respect to the joint obtained in Comparative Example 3, the shear tensile strength is 2.7 kN, and, in Example 3, it is understood that a joint having a significantly higher shear tensile strength as compared with the conventional friction stir spot joining can be obtained.

[Microstructure Observation of Joint]

In order to confirm the grain size and shape of the crystal grain at the joint portion, the EBSD measurement was conducted to the cross section of the joint portion. For the EBSD measurement, FE-SEM (JSM-7001FA available from by JEOL Ltd.) and OIM data Collection ver5.31 available from TSL were used.

With respect to the joint portions obtained in Example 1 and Example 2, the orientation map images near the joint interface are shown in FIG. 23 and FIG. 24, respectively. Fine equiaxed grains are formed by recrystallization near the both junction interfaces, and the average crystal grain size is much less than 1 μm (Example 1: 0.25 μm, Example 2: 0.33 μm).

With respect to the joint portion obtained in Comparative Example 3, the orientation map image near the joint interface is shown in FIG. 25. While the average crystal grain size of the parent material is 20 μm, the average crystal grain size of the fine equiaxed grains formed near the joint interface is 0.24 μm.

[Measurement of Joining Temperature]

The joining temperature was measured in the above Examples and Comparative Examples by using a thermal image camera (CPA-T640 available from CINO).

With respect to the joint portions obtained in Example 1 and Comparative Example 1, FIG. 26 shows the relationship between the maximum joining temperature and the rotation speed of the rotation tool. It is understood that the maximum joining temperature in Example 1 dramatically decreased as compared with the case of Comparative Example 1, and that the joining of carbon steel sheets was achieved at a low temperature around 300° C. The result also shows that a joining temperature lower than the recrystallization temperature (about 600° C.) inherent to the carbon steel sheet (S45C) is realized.

The temperature change during joining in Example 3 is shown in FIG. 27. The joining temperature increased from the start of joining and reached the maximum temperature at the finish of the joining time, it is understood that the reached temperature is an extremely low temperature, that is, 92.1° C. in the case of 40 rpm, and 69.9° C. in the case of 30 rpm. The result also shows that a joining temperature lower than the recrystallization temperature (250 to 350° C.) inherent to the aluminum alloy plate (A6061) is realized.

EXPLANATION OF SYMBOLS 2, 2" Material to be joined
4 Rotation tool
6 Joint portion
8 Body part (shoulder portion)
10 Protrusion part (probe portion)
20 Joint structure
22 Base part
24 Joint portion
26 Heat-affected zone

The invention claimed is:

1. A low-temperature joining method, comprising:
forming a joint interface in which two metal materials face each other at a joint portion;
plunging a rotation tool, having a shoulder portion defining an outermost periphery of the rotation tool, with an applied load into one of the two metal materials at the joint portion, wherein a peripheral velocity of the outermost periphery of the shoulder portion of the rotation tool is set to 51 mm/s or less during the plunging, and wherein the applied load is not less than a value at which the rotation tool plastically deforms the one metal material without rotating the rotation tool during the plunging, whereby a recrystallization temperature inherent to the metal materials is reduced by introducing a strain to the joint portion, and
forming recrystallized grains at the joint interface, wherein the joining temperature is set to less than the recrystallization temperature inherent to the two metal materials.

2. The low-temperature joining method according to claim 1, wherein an average grain size of the recrystallized grains is 1 μm or less.

3. The low-temperature joining method according to claim 1, wherein the peripheral velocity of the outermost periphery of the shoulder portion of the rotation tool is set to 32 mm/s or less.

4. The low-temperature joining method of according to claim 1, wherein the peripheral velocity of the outermost periphery of the shoulder portion of the rotation tool is set to 19 mm/s or less.

5. The low-temperature joining method according to claim 1, wherein the applied load is lowered as the temperature of the joint portion rises.

6. The low-temperature joining method according to claim 1, wherein the metal materials are aluminum or an aluminum alloy.

7. The low-temperature joining method according to claim 1, wherein the metal materials are a heat-treatment type aluminum alloy, a process-reinforcement type aluminum or a process-reinforcement type aluminum alloy.

8. The low-temperature joining method according to claim 1, wherein the metal materials are an iron-based metal.

9. The low-temperature joining method according to claim 1, wherein the rotation tool is made of an iron-based metal.

* * * * *